United States Patent
Hensley

(10) Patent No.: US 11,228,185 B2
(45) Date of Patent: Jan. 18, 2022

(54) MODULAR-SCALABLE DECENTRALIZED HIGH VOLTAGE BATTERY SYSTEM

(71) Applicant: SAFT AMERICA, INC., Cockeysville, MD (US)

(72) Inventor: Keith Hensley, Baltimore, MD (US)

(73) Assignee: SAFT AMERICA, INC., Cockeysville, MD (US)

( * ) Notice: Subject to any disclaimer, the term of this patent is extended or adjusted under 35 U.S.C. 154(b) by 0 days.

(21) Appl. No.: 16/844,207

(22) Filed: Apr. 9, 2020

(65) Prior Publication Data

US 2021/0320507 A1  Oct. 14, 2021

(51) Int. Cl.
| | |
|---|---|
| H02J 7/00 | (2006.01) |
| H01M 50/20 | (2021.01) |
| H01M 10/46 | (2006.01) |
| H01M 10/42 | (2006.01) |
| H01M 10/44 | (2006.01) |

(52) U.S. Cl.
CPC ....... H02J 7/00032 (2020.01); H01M 10/425 (2013.01); H01M 10/441 (2013.01); H01M 10/46 (2013.01); H01M 50/20 (2021.01); H02J 7/007 (2013.01); H02J 7/0013 (2013.01); H02J 7/00302 (2020.01); H02J 7/00304 (2020.01); H01M 2010/4271 (2013.01); H01M 2010/4278 (2013.01)

(58) Field of Classification Search
CPC .. H02J 7/00304; H02J 7/00302; H02J 7/0013; H02J 7/007; H01M 50/20; H01M 10/425; H01M 10/441; H01M 10/46
USPC ........................................................ 320/118
See application file for complete search history.

(56) References Cited

U.S. PATENT DOCUMENTS

| | | | |
|---|---|---|---|
| 9,413,040 B2 * | 8/2016 | Murakami et al. . | H01M 50/502 |
| 9,525,290 B2 | 12/2016 | Snyder | |
| 9,537,132 B2 * | 1/2017 | Butzmann ............... | B60L 50/52 |
| 9,577,443 B2 * | 2/2017 | Gach et al. .......... | G01R 31/382 |
| 10,069,314 B2 * | 9/2018 | Dulle ...................... | B60L 58/10 |
| 10,153,658 B2 * | 12/2018 | Nandam et al. ...... | H01M 10/48 |
| 10,538,170 B2 * | 1/2020 | Weicker .............. | H01M 10/425 |

(Continued)

FOREIGN PATENT DOCUMENTS

| | | |
|---|---|---|
| CN | 209298297 U | 8/2019 |
| EP | 2 495 802 A2 | 9/2012 |
| EP | 2 858 210 A2 | 4/2015 |

OTHER PUBLICATIONS

International Search Report dated Jul. 14, 2021, issued by the International Searching Authority in application No. PCT/US2021/024609.

(Continued)

*Primary Examiner* — Sun J Lin
(74) *Attorney, Agent, or Firm* — Sughrue Mion, PLLC

(57) ABSTRACT

Provided is a modular, scalable and decentralized high voltage battery system that employs signaling and communications between a plurality of battery modules of the system without a central battery management controller. Via signaling mechanisms, each battery module of the plurality of battery modules of the system can perform precharging, discharging, charging, and safety functions in a manner that is extensible regardless of a number of battery modules in the system in series and in parallel and in a manner that does not require significant operator intervention.

20 Claims, 4 Drawing Sheets

(56) References Cited

U.S. PATENT DOCUMENTS

| | | | |
|---|---|---|---|
| 10,601,233 B2* | 3/2020 | Tosch et al. | B60L 50/64 |
| 2013/0196205 A1* | 8/2013 | Silk et al. | H01M 10/6554 |
| | | | 429/99 |
| 2017/0358934 A1* | 12/2017 | Miller et al. | G01R 31/392 |
| 2019/0207395 A1 | 7/2019 | Snyder et al. | |

OTHER PUBLICATIONS

Written Opinion dated Jul. 14, 2021, issued by the International Searching Authority in application No. PCT/US2021/024609.

* cited by examiner

400~

PROVIDE A DOWNLINK SIGNAL TO A BATTERY MODULE OF A BATTERY STRING

410

RECEIVE AN UPLINK SIGNAL FROM THE BATTERY MODULE BASED ON PROVIDING THE DOWNLINK SIGNAL

420

CONTROL A COMPONENT BASED ON THE UPLINK SIGNAL

430

MODULAR-SCALABLE DECENTRALIZED HIGH VOLTAGE BATTERY SYSTEM

BACKGROUND

Typically, a high-voltage battery system (e.g., a 1000V system) includes a set of battery cells, cell monitoring electronics, and a centralized controller to manage safety, cell balancing, battery algorithms, and the external interface for the battery user. If the battery user desires to adjust the system by adding or removing batteries, then the system might require extensive reconfiguration of the software, electronics, or the electrical components. Accordingly, the extensibility of such systems is limited.

SUMMARY

According to an aspect of the disclosure, a modular-scalable decentralized high voltage battery system may include a plurality of battery strings each having a high voltage unit and a set of battery modules electrically connected in series. Each high voltage unit is electrically connected in parallel with the other high voltage units, and each high voltage unit of each battery string is configured to provide downlink signals to the set of battery modules, and receive uplink signals from the set of battery modules.

According to an aspect of the disclosure, a modular-scalable decentralized high voltage battery system may include a single battery string having a high voltage unit and a set of battery modules electrically connected in series. The high voltage unit is configured to provide downlink signals to the set of battery modules, and receive uplink signals from the set of battery modules.

According to an aspect of the disclosure, a high voltage unit may include an interface configured to communicate with a set of battery modules; and a processor configured to provide downlink signals to the set of battery modules via the interface; receive uplink signals from the set of battery modules via the interface, based on providing the downlink signals to the set of battery modules; and control a precharge contactor configured to enable precharging, a discharge contactor configured to enable discharging, and a charge contactor configured to enable charging, based on receiving the uplink signals.

DETAILED DESCRIPTION

The present disclosure is directed to a modular and decentralized high voltage battery system that empowers the individual battery module controllers with all the battery management functions (as opposed to a centralized controller), and employs signaling and collaboration between battery modules to ultimately provide the end user with a high voltage battery system that may include any number of battery modules in series (i.e., a battery string), and any number of battery strings in parallel. Thereby, the present disclosure offers scalability in voltage, power, and energy to the end user without the need to redesign or reconfigure the software, electronics, or electrical components.

Figure 1:
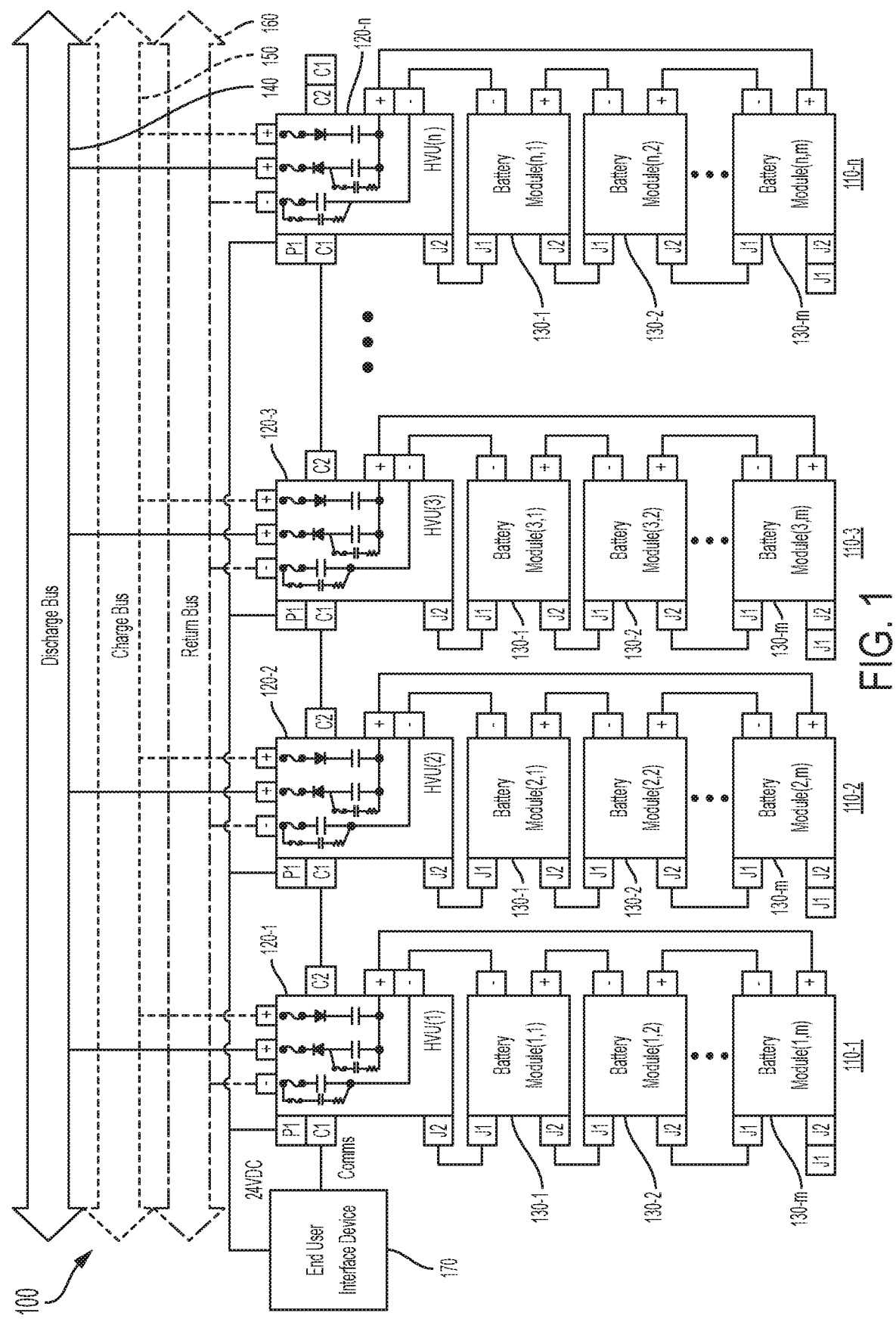
FIG. 1 is a diagram of an example modular-scalable high-voltage battery system according to an embodiment.

FIG. 1 is a diagram of an example modular-scalable high-voltage battery system according to an embodiment. As shown in FIG. 1, the modular-scalable high-voltage battery system 100 may include a set of battery strings 110, a set of high voltage units 120, a set of battery modules 130, a discharge bus 140, a charge bus 150, a return bus 160, and an end user interface device 170.

The modular-scalable high-voltage battery system 100 includes a first battery string 110-1, a second battery string 110-2, a third battery string 110-3, and an n-th battery string 110-n. The first battery string 110-1 includes a high voltage unit 120-1, and battery modules 130-1 through 130-m. The second battery string 110-2 includes a high voltage unit 120-2, and battery modules 130-1 through 130-m. The third battery string 110-3 includes a high voltage unit 120-3, and battery modules 130-1 through 130-m. The n-th battery string 110-n includes a high voltage unit 120-n, and battery modules 130-1 through 130-m.

As shown, the arrangement of one or more battery modules 130 in series electrically with a high voltage unit 120 at the top constitutes a battery string 110. Electrically paralleling one or more battery strings 110 forms the modular and decentralized high voltage battery system 100.

Via the signaling and collaboration, the individual battery modules 130 of the system 100 activate charging and discharging, precharge the discharge bus 140, balance the cells, heat the battery, and perform safety protection in a manner that is extensible regardless of the number of battery modules 130 connected in series or the number of battery strings 110 that are bussed in parallel.

The modular-scalable high-voltage battery system 100 may be configured to include bypassable battery module technology as described in U.S. Pat. No. 9,525,290, which is incorporated by reference herein in its entirety. In this way, the battery strings 110 and battery modules 130 are touch safe while non-operating in storage or while in a standby mode, and each battery module 130 is protected from short-circuit and overcharge when handled in a stand-alone manner (i.e., outside of a battery string 110).

The modular-scalable high-voltage battery system 100 may include stepwise precharge technology as described in U.S. Publication No. 2019/0207395, which is incorporated by reference herein in its entirety. For example, the modular-scalable high-voltage battery system 100 may perform a sequence for precharging the bus per battery module 130 during activation, which allows the precharge circuit to be sized based on the battery module 130 voltage and not that of the entire battery string 110 voltage, thereby enabling extensive scalability in the number of battery modules 130 connected in series.

The principle concept of the architecture of the modular-scalable high-voltage battery system 100 that enables the modularity, scalability and decentralized characteristics is the battery module 130 to battery module 130 daisy-chained discrete downlink and uplink signals, and the internal and external communications busses of the battery modules 130.

The high voltage electrical components (e.g., contactors, diodes, fuses and relays) required of high voltage battery systems for safety are not under the control of a single battery management controller. Instead, the foregoing electrical components are controlled by the distributed battery modules 130 collectively managing the high voltage output of the battery string 110. This architecture also allows for ease of maintenance because the daisy-chaining and internal communications busses enable positional localization of battery modules 130 in each battery string 110.

Each battery module 130 is configured to provide a set of discrete downlink signals used to pass user commands down the chain of battery modules 130 for wake, charge enable, and discharge enable. These user commands originate from the high voltage unit 120 at the top of each battery string 110. These downlink signals are terminated at the bottom of the battery string 110, and wrapped around into the set of discrete uplink signals that are used to convey battery module 130 status up the chain of battery modules 130 for no fault, charge status, and discharge status to the high voltage unit to activate or deactivate contactors.

The "wake" downlink signal is paired with a "no fault" uplink signal, the "charge enable" downlink signal is paired with a "charge status" uplink signal, and the "discharge enable" downlink signal is paired with a "discharge status" uplink signal.

The high voltage unit 120 samples the battery string 110 voltage and conveys this information to each of the battery modules 130 over a downlink signal. Each battery module 130 receives the battery string 110 voltage and uses the battery string 110 voltage to support charge and discharge activation.

During discharge activation, the stepwise bus precharging logic is performed by each battery module 130 when the discharge enable signal is asserted. Because all battery modules 130 read the battery string 110 voltage, the battery modules 130 can individually determine whether any voltage faults are present on the battery string 110 output bus during activation and deactivation.

Figure 2:
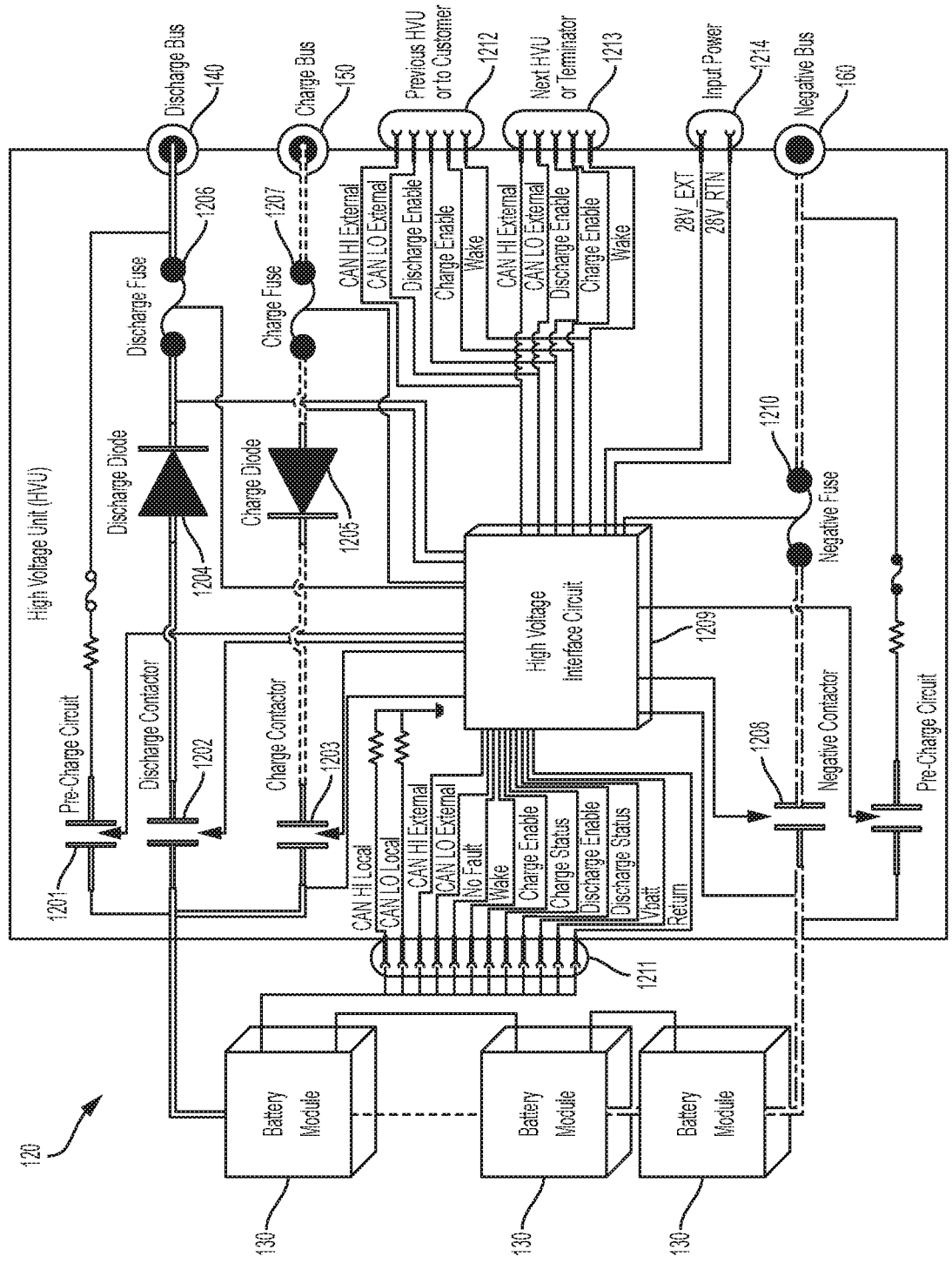
FIG. 2 is a diagram of an example high voltage unit according to an embodiment.

FIG. 2 is a diagram of an example high voltage unit 120 according to an embodiment. As shown in FIG. 2, a high voltage unit 120 may include a pre-charge circuit 1201, a discharge contactor 1202, a charge contactor 1203, a discharge diode 1204, a charge diode 1205, a discharge fuse 1206, a charge fuse 1207, a negative contactor 1208, a high voltage interface circuit 1209, a negative fuse 1210, a battery module 130 interface 1211, a previous high voltage unit 120 interface 1212, a next high voltage unit 120 interface 1213, and a power interface 1214.

Figure 3:
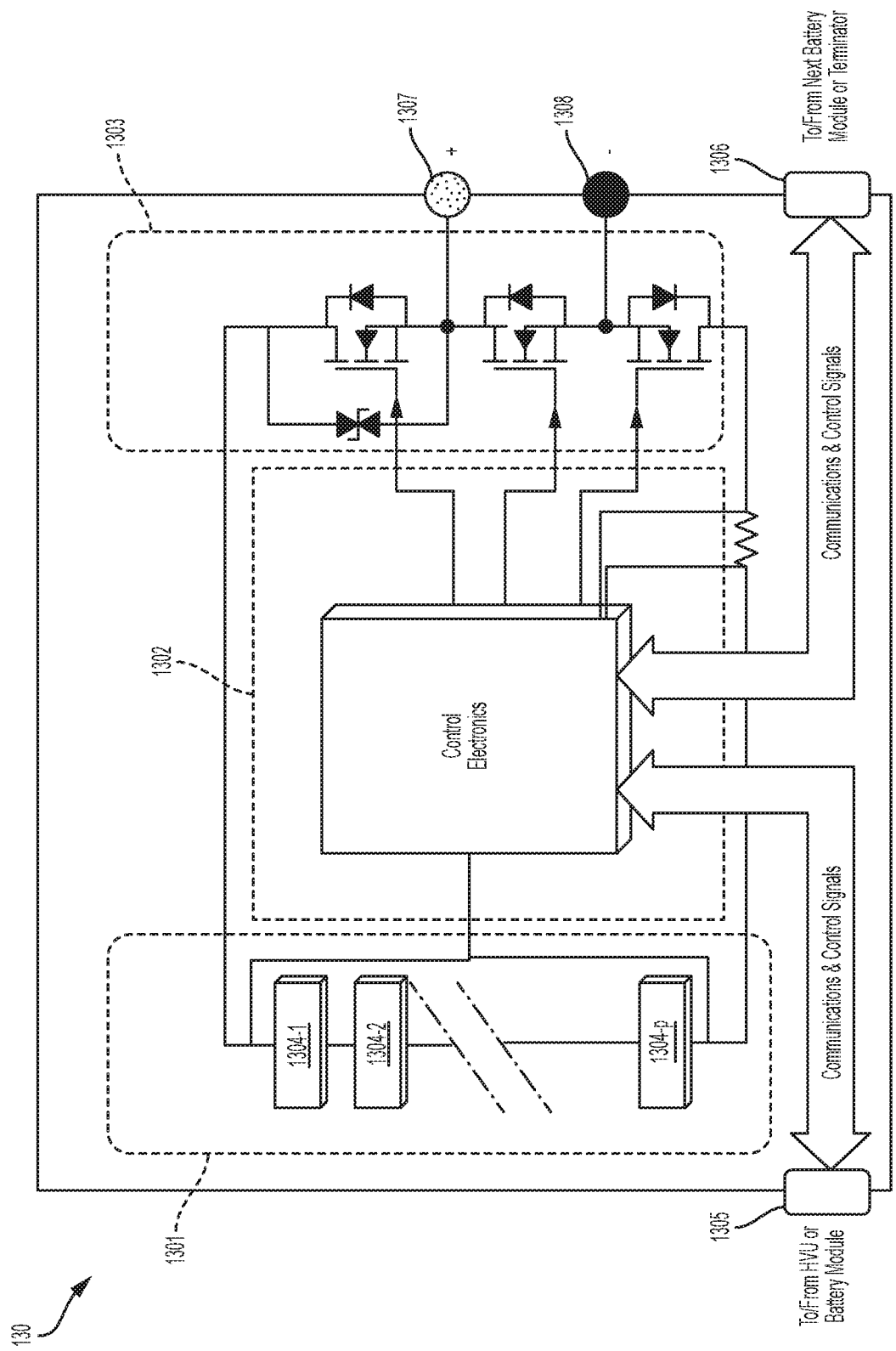
FIG. 3 is a diagram of an example battery module according to an embodiment.

FIG. 3 is a diagram of a battery module 130 according to an embodiment. As shown in FIG. 3, a battery module 130 may include a bussing board 1301, control electronics 1302, a power board 1303, cells 1304-1 through 1304-$p$, a high voltage unit 120 interface 1305, a battery module 130 interface 1306, a positive terminal 1307, and a negative terminal 1308.

Each battery module 130 is equipped with an internal (local) communications interface 1305 and an external (customer-facing) communications interface 1304. Only the top battery module 130 that is connected to the high voltage unit 120 will have an external communications interface 1304 linked to external devices; although any battery module 130 in the battery string 110 could support this function if needed. In a multi-battery string 110 deployment, the top battery modules 130 that communicate battery string 110 details and battery module 130 summary information to the customer. This effectively limits the amount of communications traffic that the customer receives to only one communications node per battery string 110. This also greatly increases the number of battery strings 110 that can be connected in parallel because most communications interfaces are limited in the number of nodes on a given communications bus without the use of network switches or routers for expansion.

The internal communications interface 1305 is local to only the battery modules 130 within a specific battery string 110. In coordination with the wake signal, the internal communications interface 1305 enables sequential addressing of each battery module 130 and verification of the number of battery modules 130 within the battery string 110. In addition to addressing (e.g., 1 to m battery modules 130 in the battery string 110), the local communications enable balancing and heating coordination using synchronized-timed broadcast messaging between battery modules 130. Each battery module 130 also collects battery information from all the other battery modules 130 within the same battery string 110, and may broadcast this information over the external communications interface 1304 if needed; but typically, only the top battery module 130 of each battery string 110 is configured to do this.

Activation refers to the act of connecting the battery string 110 output voltage to the external bus 150 at the other side of the high voltage unit 120 by closing both a positive and negative contactor. Deactivation is the act of disconnecting the battery string 110 output voltage from the external bus 150 at the other side of the high voltage unit 120 by opening a positive and/or negative contactor. This battery system architecture provides both a charge bus 150 output and discharge bus 140 output to the end-application, which are both diode-isolated from one another; meaning current can only flow in one direction for the respective bus.

In the high voltage unit 120, a positive charge contactor 1203, a positive discharge contactor 1202, and a common negative contactor 1208 that are configured to support separate charge and load sources for some applications and may be shorted for other applications where charger/load are the same equipment. In addition, the high voltage unit 120 includes a charge fuse 1207, a discharge fuse 1206, a charge diode 1205, and a discharge diode 1204, and both positive and negative pre-charge circuits 1201 (e.g., relays, fuses, and resistors). This configuration allows charging and discharging to be managed by the battery modules 130 independently; thereby disallowing charge or discharge for differing reasons.

The downlink signals, including wake, charge enable, and discharge enable, in conjunction with the uplink signals, including no fault, charge status, and discharge status, provide the physical means of waking the system up and activating or deactivating the charge bus 150 and the discharge bus 140. Both the downlink and uplink signals are daisy-chained and retransmitted from one battery module 130 to the adjacent battery modules 130 or the high voltage unit 120 in the upward or downward direction. In order to wake up the battery string 110 or battery strings, the end user asserts the wake signal to one or more high voltage units 120. The wake signal is passed to the top battery module 130 of each battery string 110 waking up only those battery modules 130 at the top. Once those top battery modules 130 have awoken and determined their address/position in the battery string 110, the top battery modules 130 wake the next battery modules 130 within their respective battery string 110 and so forth.

Based on all the battery modules 130 having received the wake signal, that signal is wrapped around at the bottom of the battery string 110 to the "no fault" uplink signal. Assuming all battery modules 130 have no faults present via built-in-test diagnostics, the no fault signal will traverse its way up the uplink successfully and provide the no fault indication to the high voltage units 120 at the top of the parallel battery strings 110 completing the wake up sequence. As an alternative, a wake command could be sent over the external communications interface to wake up the top battery modules 130, and the battery modules 130 then send the discrete wake signal down the battery module 130 chain and therefore the no fault signal back up the battery module chain to accomplish the same wake up sequence (as above) using external communications rather than discrete signal to the high voltage unit 120.

In order to enable discharging, the end user asserts the discharge enable signal to one or more high voltage units 120, which in turn closes the precharge positive and negative contactors of the pre-charge circuit 1201 and passes the discharge enable to the top battery module 130 of each battery string 110. Based on those top battery modules 130 having un-bypassed their output and determined their module voltage is connected to the battery string and the pre-charge current has dropped below some threshold within a period of time for stepwise precharging, the top battery modules 130 pass the discharge enable signal to the next battery modules 130 within their respective battery string 110 and so forth.

Based on all the battery modules 130 having received the discharge enable signal and un-bypassed sequentially, that signal is wrapped around at the bottom of the battery string to the discharge status uplink signal. Assuming all battery modules 130 have no discharge faults present via built-in-test diagnostics, the discharge status signal will traverse its way up the uplink successfully and provide a positive discharge indication to the high voltage units 120 at the top of the parallel battery strings 110 completing the discharge activation sequence and closing the discharge positive contactor 1202 and negative contactor 1208.

As an alternative, a discharge enable command could be sent over the external communications interface to enable discharge for the top battery modules 130. Then, the top battery modules 130 can send the discrete discharge enable signal up to the high voltage unit 120 and down the battery module chain and therefore the discharge status signal back up the battery module chain to accomplish the same discharge enable sequence (as above) using external communications rather than discrete signal to the high voltage unit 120.

In order to enable charging, the end user asserts the charge enable signal to one or more high voltage units 120, which in turn passes the charge enable to the top battery module 130 of each battery string 110. Based on those top battery modules 130 having un-bypassed their output and determined their module voltage is connected to the battery string 110, the top battery modules 130 pass the charge enable the next battery modules 130 within their respective battery string 110 and so forth. Based on all the battery modules 130 having received the charge enable signal and un-bypassed sequentially, that signal is wrapped around at the bottom of the battery string to the charge status uplink signal. Assuming all battery modules 130 have no charge faults presents via built-in-test diagnostics, the charge status signal will traverse its way up the uplink successfully and provide a positive charge indication to the high voltage units 120 at the top of the parallel battery strings 110 completing the charge activation sequence and closing the charge positive contactor and negative contactor.

As an alternative, a charge enable command can be sent over the external communications interface to enable charge for the top battery modules 130, which then sends the discrete charge enable signal up to the high voltage unit 120 and down the battery module chain 110 and therefore the charge status signal back up the battery module chain 110 to accomplish the same charge enable sequence (as above) using external communications rather than discrete signal to the high voltage unit.

Based on the diode-isolation of the charge bus 150 and the discharge bus 140 and the stepwise precharge approach used to precharge the discharge bus 140, charging can only be enabled standalone or after activating the discharge bus 140. Discharge activation is disabled if the charge bus 150 is already activated.

Based on the charge bus 150 and the discharge bus 140 being managed independently, each battery module 130 has the authority to stop one or the other or both by de-asserting the "charge status," "discharge status" or "no fault" signal. De-asserting the charge status signal by any battery module 130 will open and latch the positive charge contactor, while de-asserting the discharge status signal by any battery module will open and latch the positive discharge contactor 1202, and de-asserting the no fault signal by any battery module 130 will open and latch the positive charge contactor 1203, positive discharge contactor 1202, and negative contactor 1208. As an additional safeguard, if both the charge contactor 1203 and discharge contactor 1202 are open, the common negative contactor 1208 opens as well. The end user may also disable charging and/or discharging by de-asserting the charge enable, discharge enable, and/or wake enable at the end user interface device 170. All contactors that open after an activation sequence will be latched open until the corresponding charge or discharge enable is de-asserted, or wake signal is de-asserted at the high voltage unit 120.

Each battery module 130 contains overload (over-current) protection. If the current seen by the battery module 130 exceeds its rated allowance, the battery module 130 automatically bypasses its output. At the system level, the battery module 130 goes to a partial bypass state and de-asserts the no fault signal on the uplink causing the contactors to open prior to the battery module 130 going into a full bypass state. This protects the battery module 130's power electronics, as well as, protects the end-application's power electronics from a sudden in/out-rush of current when a battery module 130 bypasses. Over-current is also protected by fuses 1206, 1207, and 1210 in the high voltage unit 120 on the charge positive, discharge positive and negative outputs. Over-charge, over-discharge, and over/under temperature are all managed by each battery module 130 based on measurements on their respective battery cells 1304 and control electronics 1302.

This battery system architecture is designed to support an (n×m) matrix of battery modules 130 such that a high voltage unit 120 is at the top of each battery string in parallel. (n) represents the number of battery strings in parallel, and (m) represents the number of battery modules in series within each battery string. There is no logical limit to the (m) number of battery modules in series; nor any logical limit to the (n) number of battery strings in parallel. The limitations of the (n×m) matrix are strictly hardware limits for the rated components (i.e., voltage, current, and power limits) used within the battery module 130 and the high voltage unit 120, and not an architectural constraint of the battery system 100. It should be understood that (n) may be one, two, three, five, etc; and that (m) may be one, two, three, five, etc. Further, it should be understood that (n) may be the same as (m) or may be different than (m). Further, battery strings 110 may include the same number (m) of battery modules 130, or a different number (m) of battery modules 130.

The above system architecture can be implemented without the use of bypassable battery modules 130 in a series and/or parallel arrangements with a high voltage unit 120; however, the battery modules 130 would include live voltage at their terminals (reducing safety and ease of maintainability) and normal battery voltage precharge would be required to precharge the external discharge bus, which could greatly increase the precharge time at higher voltages and may require differing precharge components (i.e., higher resistance precharge resistors, fuses and relay ratings) for different end-applications depending on bus capacitance and voltage needs. The bypassable version of this system architecture sizes all the precharge components for the battery module 130 voltage rather than the system battery string 110 voltage; greatly increasing the reusability of system components.

Having both a charge bus 150 and a discharge bus 140 is only one variation of the above system architecture, which provides the most flexibility for the end-application to have a separate charger and load managed independently by the battery modules 130, or to have a single charge/discharge device and shorting the charge positive and discharge positive externally. An alternative to having separate charge and discharge busses 150 and 140 could be to implement a single bus that supports both charge and discharge without the use diodes to block current in the opposite direction on the main output bus. This variation would require only one "battery enable" downlink signal (as opposed to both a charge and discharge enable) and only one "battery status" uplink signal to facilitate contactor activation and deactivation.

In addition, the battery modules 130 may include both a battery string voltage (pre-contactor voltage) and bus voltage (post-contactor voltage) conveyed to all the battery modules 130 in the battery string 110 in order to perform precharge properly. This configuration and using stepwise precharge may include diodes facing the discharge direction in the precharge circuit so that during stepwise precharge, charge current cannot flow back into the battery modules 130 during their sequential un-bypassing when precharging. Alternatively, the top battery module 130 of the battery string 110 or the high voltage unit 120 could prevent closing the precharge relays until the bus voltage is within one battery module 130's voltage of the battery string 110 voltage. Either way, it is important that current flow only in the discharge direction during precharge or that the battery string 110 voltage and bus voltage are equal to within one battery module 130 before precharging. This alternative could be implemented with or without bypassable battery modules 130.

This alternate configuration is a hybrid of the primary architecture and the one above. It could be easily implemented with a single "battery enable" downlink signal (and "battery status" uplink signal) for the main output bus and a "charge enable" (and "charge status" uplink signal) for the secondary charge bus, which uses a diode to block discharge current. The main use case of this implementation would be in an end-application with bidirectional charge/discharge capability and a secondary charger for fill-up or maintenance. The battery modules 130 in the battery string 110 would again require the need to be conveyed both battery string voltage and bus voltage (as in the above alternate) in order to perform precharge properly. This alternative could be implemented with or without bypassable battery modules.

Another variation of this architecture is to use a virtual downlink over the internal and external communications interfaces; instead of discrete downlink signals daisy-chained from one battery module to another. The wake, charge enable, and discharge enable (or battery enable) signals would be commanded by the end user over the external communications bus to the top battery module 130 (or any battery module 130) in the battery string 110, and repeated peer-to-peer in sequence to each of the battery modules 130 in the battery string on the internal communications interface. Battery modules 130 would be serially addressed automatically during the wake-up sequence by utilizing an uplink signal (e.g., no fault) and collaborating on the internal communications interface to discover the physical order of the battery modules.

The foregoing disclosure provides illustration and description, but is not intended to be exhaustive or to limit the implementations to the precise form disclosed. Modifications and variations are possible in light of the above disclosure or may be acquired from practice of the implementations.

The high voltage interface circuit 1209 of the high voltage unit 120 and/or the control electronics 1302 of the battery module 130 may be implemented in hardware, firmware, or a combination of hardware and software. The high voltage interface circuit 1209 of the high voltage unit 120 and/or the control electronics 1302 of the battery module 130 may include a processor (e.g., a central processing unit (CPU), an accelerated processing unit (APU), etc.), a microprocessor, a controller, a microcontroller, and/or any other type of processing component (e.g., a field-programmable gate array (FPGA), an application-specific integrated circuit (ASIC), etc.) that interprets and/or executes instructions.

The high voltage interface circuit 1209 of the high voltage unit 120 and/or the control electronics 1302 of the battery module 130 may include one or more processors capable of being programmed to perform a function. A memory, such as a random access memory (RAM), a read only memory (ROM), a flash memory, an optical memory, etc., may store information and/or instructions for use by the high voltage interface circuit 1209 of the high voltage unit 120 and/or the control electronics 1302 of the battery module 130. The high voltage interface circuit 1209 of the high voltage unit 120 and/or the control electronics 1302 of the battery module 130 may obtain information from one or more sensors (e.g., voltage sensors, current sensors, heat sensors, and/or the like), from a data structure, and/or the like, and perform one or more actions based on the obtained information.

Figure 4:
FIG. 4 is a flowchart of an example control process of a high voltage unit according to an embodiment.
Figure 4:

FIG. 4 is an example control process of a battery module according to an embodiment. Process 400 may be performed by high voltage unit 120, or battery module 130.

As shown in FIG. 4, process 400 may include providing a downlink signal to a battery module of a battery string (block 410).

In an embodiment, a high voltage unit 120 may include precharge circuits 1201 configured to enable precharging, a discharge contactor 1202 configured to enable discharging, a charge contactor 1203 configured to enable charging, a high voltage interface circuit 1209, a battery module 130 interface 1211, and a previous high voltage unit 120 interface 1212.

The high voltage unit 120 may provide a downlink signal to a set of battery modules 130 of a battery string 110 via the battery module 130 interface 1211. For example, the high voltage unit 120 may provide a wake downlink signal, a charge enable downlink signal, a discharge enable downlink signal.

As shown in FIG. 4, process 400 may include receiving an uplink signal from the battery module of the battery string based on providing the downlink signal (block 420).

The high voltage unit 120 may receive a no fault uplink signal that is paired with the wake downlink signal (e.g., received based on the no fault signal), a charge status uplink signal that is paired with the charge enable downlink signal (e.g., received based on the charge enable downlink signal), and a discharge status uplink signal that is paired with the discharge enable downlink signal (e.g., received based on the discharge enable downlink signal).

As shown in FIG. 4, process 400 may include controlling a component based on the uplink signal (block 430).

The high voltage unit 120 may control the precharge contactors 1201 configured to enable precharging, the discharge contactor 1202 configured to enable discharging, and the charge contactor 1203 configured to enable charging, based on receiving the uplink signal.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A modular-scalable decentralized high voltage battery system, comprising:
    a plurality of battery strings, each battery string having a high voltage unit and a set of battery modules electrically connected in series,
    wherein each high voltage unit is electrically connected in parallel with other high voltage units, and
    wherein each high voltage unit of each battery string is configured to provide downlink signals to the set of battery modules of said each battery string, and receive uplink signals from the set of battery modules of said each battery string.

2. The modular-scalable decentralized high voltage battery system of claim 1, wherein, for each battery string, a bottom battery module of the set of battery modules is configured to:
    terminate the downlink signals based on receiving the downlink signals from the high voltage unit; and
    provide the uplink signals to the high voltage unit based on terminating the downlink signals.

3. The modular-scalable decentralized high voltage battery system of claim 1, wherein the downlink signals include a wake downlink signal that is paired with a no fault uplink signal.

4. The modular-scalable decentralized high voltage battery system of claim 1, wherein the downlink signals include a charge enable downlink signal that is paired with a charge status uplink signal.

5. The modular-scalable decentralized high voltage battery system of claim 1, wherein the downlink signals include a discharge enable downlink signal that is paired with a discharge status uplink signal.

6. The modular-scalable decentralized high voltage battery system of claim 1, wherein each high voltage unit is configured to control a respective precharge contactor configured to enable precharging, a respective discharge contactor configured to enable discharging, and a respective charge contactor configured to enable charging, based on receiving the uplink signals.

7. The modular-scalable decentralized high voltage battery system of claim 1, wherein the system does not include a central controller.

8. A modular-scalable decentralized high voltage battery system, comprising:
    a single battery string having a high voltage unit and a set of battery modules electrically connected in series,
    wherein the high voltage unit is configured to provide downlink signals to the set of battery modules, and receive uplink signals from the set of battery modules.

9. The modular-scalable decentralized high voltage battery system of claim 8, wherein a bottom battery module of the set of battery modules is configured to:
    terminate the downlink signals based on receiving the downlink signals from the high voltage unit; and
    provide the uplink signals to the high voltage unit based on terminating the downlink signals.

10. The modular-scalable decentralized high voltage battery system of claim 8, wherein the downlink signals include a wake downlink signal that is paired with a no fault uplink signal.

11. The modular-scalable decentralized high voltage battery system of claim 8, wherein the downlink signals include a charge enable downlink signal that is paired with a charge status uplink signal.

12. The modular-scalable decentralized high voltage battery system of claim 8, wherein the downlink signals include a discharge enable downlink signal that is paired with a discharge status uplink signal.

13. The modular-scalable decentralized high voltage battery system of claim 8, wherein the high voltage unit is configured to control a precharge contactor configured to enable precharging, a discharge contactor configured to enable discharging, and a charge contactor configured to enable charging, based on receiving the uplink signals.

14. The modular-scalable decentralized high voltage battery system of claim 8, wherein the system does not include a central controller.

15. A high voltage unit, comprising:
an interface configured to communicate with a set of battery modules; and
an electronics circuit configured to:
provide downlink signals to the set of battery modules via the interface;
receive uplink signals from the set of battery modules via the interface, based on providing the downlink signals to the set of battery modules; and
control a precharge contactor configured to enable precharging, a discharge contactor configured to enable discharging, and a charge contactor configured to enable charging, based on receiving the uplink signals.

16. The high voltage unit of claim 15, wherein the downlink signals include a wake downlink signal that is paired with a no fault uplink signal.

17. The high voltage unit of claim 15, wherein the downlink signals include a charge enable downlink signal that is paired with a charge status uplink signal.

18. The high voltage unit of claim 15, wherein the downlink signals include a discharge enable downlink signal that is paired with a discharge status uplink signal.

19. The high voltage unit of claim 15, wherein the high voltage unit is electrically connected to a set of high voltage units in parallel.

20. The high voltage unit of claim 19, wherein each high voltage unit of the set of high voltage units is associated with a battery string having a set of battery modules electrically connected in series.

* * * * *